United States Patent [19]

Baker, deceased et al.

[11] Patent Number: 4,617,835

[45] Date of Patent: Oct. 21, 1986

[54] TRANSMISSION

[76] Inventors: Herbert K. Baker, deceased, late of Oak Park; by Harriett V. Baker, heir, 24481 Republic, Oak Park, both of Mich. 48237

[21] Appl. No.: 631,445

[22] Filed: Jul. 16, 1984

Related U.S. Application Data

[63] Continuation of Ser. No. 253,038, Apr. 10, 1981, abandoned.

[51] Int. Cl.[4] .............................................. F16H 47/04
[52] U.S. Cl. ....................................... 74/677; 74/688; 74/645
[58] Field of Search .................. 74/677, 687, 688, 645

[56] References Cited

U.S. PATENT DOCUMENTS

| | | | |
|---|---|---|---|
| 2,865,227 | 12/1958 | Kelly et al. | 74/645 |
| 2,950,631 | 8/1960 | Seybold | 74/677 |
| 2,981,125 | 4/1961 | Dodge | 74/688 |
| 3,000,234 | 9/1961 | Burtnett | 74/688 |
| 3,073,181 | 1/1963 | Kronogard | 74/677 |
| 3,150,542 | 9/1964 | Baker | 74/688 |
| 3,188,887 | 6/1965 | Gabriel | 74/688 |
| 3,212,357 | 10/1965 | Knowles et al. | 64/677 |
| 3,282,129 | 11/1966 | Gabriel | 74/677 |
| 3,358,530 | 12/1967 | Baker | 74/677 |
| 3,442,152 | 5/1969 | Chana | 74/645 |
| 4,229,996 | 10/1980 | Hildebrand | 74/688 |
| 4,232,567 | 11/1980 | Hobbs | 74/677 |

FOREIGN PATENT DOCUMENTS

1285446  12/1962  France ............................... 74/688

Primary Examiner—Kenneth J. Dorner
Assistant Examiner—Joseph M. Rolnicki
Attorney, Agent, or Firm—Gifford, Groh, VanOphem, Sheridan, Sprinkle & Dolgorukov

[57] ABSTRACT

The present invention provides a high efficiency automatic transmission for a vehicle in which the input speed to output speed gearing ratio is infinitely variable. The transmission of the present invention comprises a torque converter assembly having a first impeller drivingly connected to an input shaft. A second stage impeller is operatively coupled to a sun gear and receives the fluid from the first stage impeller. A turbine receives the fluid from the second stage impeller and this turbine, in turn, is drivingly connected to a ring gear. A reaction member operatively coupled with a one-way brake is disposed between the outlet end of the turbine vanes and the inlet end of the first stage vanes. At least one pair, and preferably three pair, of intermeshed pinions are disposed between the sun and ring gears so that one pinion also meshes with the sun gear while the other pinion meshes with the ring gear. The orbital movement of these pinions is transmitted to an output shaft from the transmission via a carrier assembly.

5 Claims, 8 Drawing Figures

TRANSMISSION

CROSS REFERENCE TO RELATED APPLICATIONS

This is a continuation of application Ser. No. 253,038, filed 4-10-81, now abandoned.

BACKGROUND OF THE INVENTION

I. Field of the Invention

This invention relates to automotive transmissions and other installations requiring torque conversion from a power source.

II. Description of the Prior Art

There are many previously known automatic transmissions for vehicles. These previously known automatic transmissions, however, do not provide an infinitely variable gearing ratio between the input and output shafts.

SUMMARY OF THE PRESENT INVENTION

The present device, in part, provides improvements to disclosures of my prior U.S. Pat. No. 3,358,530 and incorporates the concept of an infinitely variable ratio planetary gear set in differential coaction with members of a hydraulic system, in a transmission device to provide "forward", "reverse" and "park" operations.

The infinitely variable ratioing planetary gear set of the present device is operable only in the "forward" drive position. A first stage impeller is driven by a power source or input shaft. A turbine drives, through a clutching device, the input member of the planetary gear set and a feedback member thereof drives a second stage impeller acting in sequence between the first stage impeller and the turbine. An output planetary gear set member, through pinions, is directly ratio responsive to the differential action between the turbine driven input gear set member and the feedback member driving the second stage impeller. The extent of loading on the output gear set member increases or decreases the differential between the turbine driven input member and the feedback member. Relatively heavier loading increases the differential while the lighter loading decreases the differential.

Utilizing the example planetary gear set member ratio proportions as described hereinafter, by disconnecting the hydraulic system, holding the output member stationary and rotating the input member 0.500 of a revolution, the feedback member rotates 1.000 revolution in the same direction. Therefore, the torque ratio of the feedback member is 0.500 relative to that of the input member and the differential reaction runout ratio between the two members is 0.500, at the stall condition of the output member.

This differential reaction runout relationship is important to the calculation of an overrunning factor of the second stage impeller and this reaction runout is similar to that of an automobile differential drive when one wheel looses traction, spins, and neutralizes the drive of the other wheel to a zero speed. However, with the present device, this differential reaction exerted on the feedback member is precisely restrained by the velocity impact force of the second stage impeller vanes on the motive fluid discharging from the power driven first stage impeller vanes. The motive fluid impinging on the turbine vanes, as discharged from the second stage impeller vanes, has the combined components of force exerted by both the first stage and second stage impellers.

To provide an understanding of the unusual performance, efficiency and functional simplicity of the present device, calculations of the force values follow. As an example, the power source utilized is an internal combustion engine which produces 120 net ft. lbs. torque at 2400 r.p.m., i.e., the conventional match point of the fluid clutching transmissions. The first stage impeller vanes are preferably formed to extend radially outwardly to absorb the power source torque, at the match point, and impart the equivalent velocity force to the motive fluid. This impeller torque absorption, which varies with speed, has a torque to speed basic ratio of 1.000. The second stage impeller vanes are preferably formed to extend radially outward a distance sufficient to absorb 0.500 torque ratio, relative to the basic ratio of 1.000, and impart the equivalent velocity of force to the motive fluid.

A very important object of the present invention is to provide means to exert an overrunning factor to the second stage impeller. Two variable forces are utilized to achieve this. The first force is the differential reaction feedback which, at start-up, is equivalent in torque to the radially outwardly torque absorption. However, the differential reaction feedback progressively increases its torque exertion simultaneously with decreasing differential torque between the driven input member and the feedback member which drives the now overrunning second stage impeller to impart additional rotary velocity to the motive fluid.

The second variable force utilized is that of the feedback ratio of the turbine torque amplification. The turbine torque amplification is at its peak torque at output start-up and then progressively diminishes to zero at the fluid clutching match point. Consequently, the two forces overlap and the sum of both is the torque value of the overrunning factor. This overrunning factor causes the first stage impeller's operating speed to be intermediate the speed of the second stage impeller and the speed of the turbine. Thus, at the fluid clutching match point, for the example given, the turbine fluid discharge velocity is nearly that of the input vane ends of the first stage impeller. This provision almost completely eliminates the efficiency loss caused by the much greater differential common to the previously known devices. For the purpose of comparison with the prior art, as to the torque conversion capability, functional simplicity of performance and overall efficiency, the following calculations are pertinent to the present device.

With the present device's fluid clutching match point of 120 ft. lbs. torque at 2400 r.p.m., 120 ft. lbs. is the torque absorption value by the first stage impeller. Relative to the basic 1.000 speed ratio, the second stage impeller centrifugal head and the turbine centifugal head are at a 0.120 differential of the speeds. The power driven first stage impeller vanes impart force to the motive fluid which discharges therefrom directly into the overrunning fluid passages between the second stage impeller vanes.

The feedback circuit absorbs 0.500 of the torque transmitted to the input member from the turbine torque thus precisely restoring the torque absorbed by the feedback member including the overrunning factor resulting from the differential reaction of the feedback member.

The overrunning factor is calculated as follows:

Overrunning factor = differential
reaction ratio —
Second stage impeller and turbine
centrifugal head ratio
Or for the example -
.380 = .500 — .120
(Overrunning factor × feedback member torque
absorption ratio) — (Second stage impeller
radial vane fluid force ratio/combined fluid
force ratio) = overrunning ratio factor
Or for the example
(.380 × .500) — (.5/1.5) = .127
Overrunning speed to first stage impeller
speed = overrunning ratio factor + basic
speed ratio
Or for the example
.127 + 1.000 = 1.127

As previously set forth, the centrifugal heads between the turbine and first impeller are at a 0.120 differential ratio of speed. The basic impeller speed ratio thus equals 1.000—0.120=0.880 of the turbine speed ratio. The second stage impeller overrunning speed ratio as calculated above is equal to 1.127. Thus, the corrected turbine speed ratio caused by the feedback circuit is equal to 1.127/0.880 or 0.991. The corrected centrifugal heads differential between second stage impeller and turbine, re-spectively, are 1.127/0.991 or 1.137. The ratio 1.137 equals the ratio of the fluid velocity travel at a 1.000 ratio of torque value absorbtion by the turbine but without calculation of the fluid impingement torque of the reaction member vanes. The reaction member is mounted on a one-way brake for free wheeling and is fluidly disposed between the turbine discharging vane ends and the input vane ends of the first stage impeller.

The efficiency loss factor of the previously known torque converters with a single impeller is caused by the fluid discharge velocity lag from the turbine which is imposed on the power driven impeller vanes at their inlet ends. With single impeller operation, the impeller speed ratio of 1.000—0.120 turbine differential produces a turbine speed ratio of 0.880 and constitutes the efficiency ratio of the hydraulic system. In contrast, the present device has an efficiency ratio equal to the turbine speed ratio, 0.991. The efficiency ratio of 0.991 is computed at the fluid clutching match point and represents the output gear set member ratio responsiveness to the differential between the input and feedback members.

For the example planetary gear set ratioing proportions, the differential between feedback and output member is 2.000 times greater than the ratio between input and feedback members. The output member is further equal to the basic speed 1.000 ratio of the power driven first stage impeller. Input to the feedback differential is calculated as follows:

0.120×2.000—(1.127—1.000)=0.113

The differential between output and power speed ratio or (1.000—0.113) equal 0.887 which is the speed ratio of the output gear member. Assuming an input torque of 120 ft. lbs., the output torque at the match point is calculated as follows:

Input torque differential
speed × efficiency = 120/0.887×0.991 = 135.2 ft. lbs.

As the power source speed increases, this differential relative to the output member diminishes.

To provide an understanding of the overall torque conversion and the relative efficiency thereof, by the present device, at output "start-up", descriptive calculations are presented as follows. At the moment of stall the output gear set member has an unloaded zero speed ratio. However, the motive fluid impingement of the turbine vanes exerts a force action to narrow the differential between the input and feedback gear set members. Therefore, the output member start-up at stalling of the output will be calculated from a differential of 0.486 between the input and feedback members, instead of said differential 0.500 reaction runout. The feedback initially absorbs a ratioed proportion of the acting force imparted fluidly by the power driven first stage impeller with the basic speed ratio of 1.000—0.486 or 0.514 which is the initial or preliminary turbine speed ratio. The basic speed ratio of 1.000 divided by 0.514 equals 1.945 which is the ratio of fluid velocity exerted from the differential of the centrifugal heads between the second stage and turbine. This ratio of 1.945 less the turbine absorption ratio of 1.137 at the fluid clutching match point equals 0.808. Assuming the angle of the output edge of the turbine vanes to be 39° 0, then this ratio (0.808) divided by the secant of the turbine vane output edges (1.287) equal 0.627 which represents the velocity ratio converted to linear rotative movement and which is subject to another absorption factor. Since the mean depth of the turbine fluid input vane ends are at a radial distance from the common axis twice that of the turbine discharging vane ends, the velocity ratio of the turbine input vane ends to the turbine discharging vane ends equals 0.514/2.000 or 0.257.

At the fluid clutching match point, the differential between said basic speed ratio and the turbine equals 0.120 and at start-up (0.486—0.120)/2.000=0.183 which is the velocity ratio of the additional turbine by the difference in turbine speed ratio. The linear velocity ratio of 0.628 less 0.183 equals 0.444 which is the ratio turbine torque amplification factor. This ratio 0.444 multiplied by the 0.500 ratio of the feedback member equals 0.222, and 0.222 minus (0.222×0.333) equals 0.148 or the overrunning factor exerted by turbine torque amplification.

The overrunning speed ratio of 1.152 multiplied by the preliminary speed ratio of the turbine (0.514) equals 0.592 which is the corrected turbine speed ratio relative to the overrunning factor. The power driven first stage impeller normal speed ratio of 1.000 divided by the corrected turbine speed ratio of 0.592 equals 1.672 which is the speed ratio of first stage relative to the basic 1.000 speed ratio of turbine. The turbine torque ratio of 1.444 divided by the speed ratio of 1.672 equals 0.863 which equals the efficiency ratio of the hydraulic system at a turbine speed ratio of 0.592. The difference of this ratio (0.592) less the second stage speed ratio (1.52×0.500), multiplied by the output differential (2.000) equals 0.032 which is the speed ratio output gear set member at start-up, relative to the power driven first stage impeller of a speed 1.000 ratio.

As previously described, the differential ratioing action is directly responsive to the loading imposed upon the output gear set member and the present device can fluid clutch with the low input speeds at start-up. However, upon maximum output loading, e.g., at 1000 r.p.m., the first stage impeller absorbs 35.1 ft. lbs. of torque from the power source. Therefore, the first stage impeller speed ratio (1.000/0.032) multiplied by the efficiency ratio (0.863) equals 26.9, which multiplied by the torque ratio of 35.1 equals 944.1 ft. lbs. output torque at start-up.

From the turbine discharge impingement reaction, the net fluid flow ratio of divided by the ratio of the velocity input and output at the vane ends of first stage impeller (0.628/0.500) equals 1.256 which is the secant of 37° 14′. Assuming the reaction member having a vane angle of 37° 14′ then the linear velocity ratio of 1.000 multiplied by 0.500 equals 0.500, i.e. the linear return fluid flow ratio coinciding with rotative velocity of the input vane ends of the first stage impeller but without efficiency loss. Should the vane thickness relative to the fluid passage width therebetween become a factor in increasing fluid discharge velocity, this can be rectified, by increasing the angularity and consequently the secant factor of absorption.

One of the advantages of this differential action output drive is that with increasing speed, the torque ratio diminishes simultaneously, thus eliminating vehicle tire spin which occurs with the previously known stepping gear ratio transmissions, manual shift or automatics. Another advantage is that as the differential between the input and feedback gear set members widen, the pinions increase their relative speed, thus distributing the increasing torque loading on a greater number of pinion teeth as output speed diminishes and torque ratio increases.

Because the present device's torque conversion is smoothly progressive from start-up to fluid clutching and since the hydraulic system absorbs only a minor portion of the power source torque capability, acceleration is excellent including performance and unsurpassed overall efficiency with respect to the previously known vehicle transmissions. This is especially true for diesel engine drives.

Additional innovative features of the present device include that of clutching the turbine drive to the input gear set member by the initial movement of the accelerator pedal. This precedes acceleration of the power source and the clutch releases after return to power idling speeds.

Another feature is the addition of a one-way clutch operative between the output drive shaft and the power source so as to utilize the latter as a braking restraint whenever said output tends to overrun the power source in the forward drive operation.

An optional design feature of the invention comprises braking means selectively actuated by hydraulic means, immediately after clutching release, which holds the turbine stationary. When this occurs, the turbine acts as a hydraulic brake restraint to the power train of commercial vehicles as is desirable in mountaineous terrain.

Still another feature is the utilization of the single drive shaft for both forward drive and reverse drive operation. The present invention provides an infinitely variable ratio forward drive and a substantial fixed gear ratio reverse drive to prevent dangerous acceleration during reverse drive.

BRIEF DESCRIPTION OF THE DRAWINGS

A better understanding of the present invention will be had upon reference to the following detailed description when read in conjunction with the accompanying drawings, wherein like references refer to like parts throughout the several views, and in which.

DETAILED DESCRIPTION OF A PREFERRED EMBODIMENT OF THE PRESENT INVENTION

Figure 1:
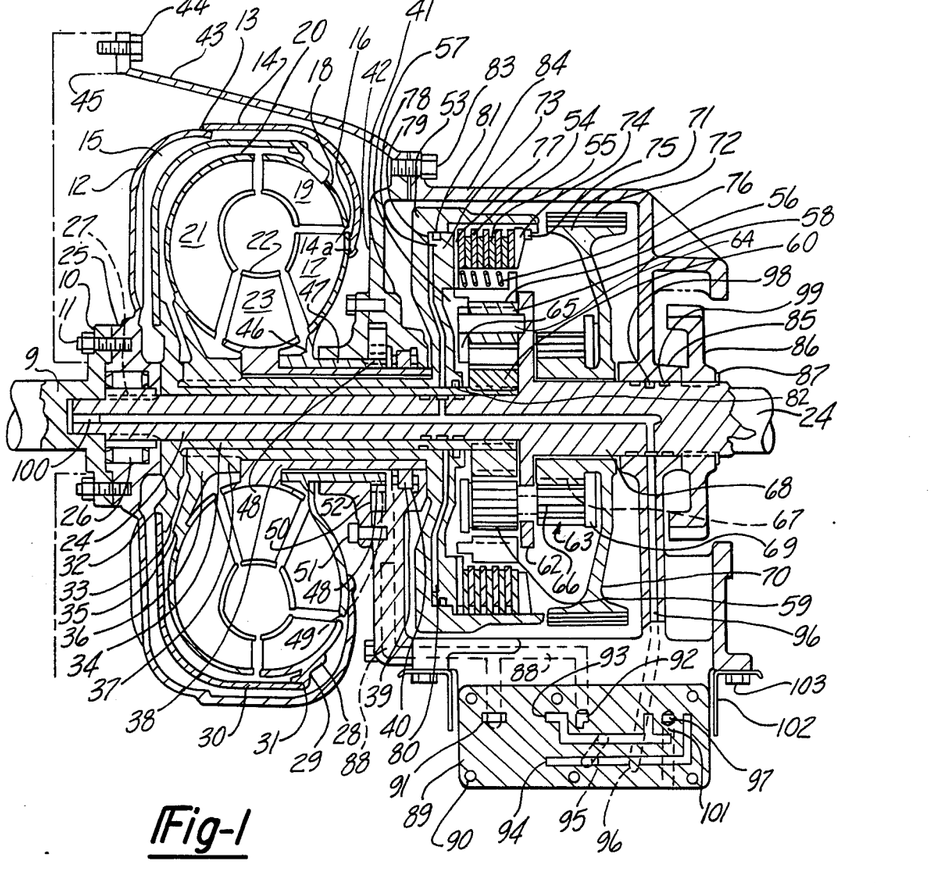
FIG. 1 is a longitudinal sectional view through the present transmission device.

Referring to FIG. 1, a power driven input member 9 has a flanged end 10 which is bolted at 11 to a forward enclosure case portion 12. The case portion 12 is in turn circumferentially welded at 13 to a rearward case portion 14 to seal against fluid leakage and so that the case portions 12 and 14 rotate together. The rearward case portion 14 encloses a hydraulic torque converter member assembly 15 having a first stage impeller 16 with vanes 17 brazed or welded at 14a to the rearward case portion 14 so that the first stage impeller 16 rotates in unison with the power driven input member 9. The torque converter assembly 15 further comprises a second stage impeller 18 having vanes 19 and a turbine 20 having vanes 21. Rotatably supported in a blind bore of the power input member 9 is a through output member shaft 24. A hub 25 is welded to the forward enclosure case portion 12 and bored to form the outer race of a sprag type overrunning clutch 26. The inner race 27 of the clutch 26 is splined fitted to turn with the output member shaft 24.

The second stage impeller 18 is welded at 28 to a filler ring 29 which in turn is welded or brazed to a drive coupling 30 at 31 and welded at 32 to a hub 33 integral with sleeve shaft 34. The turbine 20 is welded at 35 to a hub 36 spline fitted to sleeve shaft 37. A hydraulic reaction member 22 is brazed or welded to sleeve shaft 38 and forms the inner race for a one-way brake 39. The brake 39 has an outer stationary race 40 formed in the central portion 41 of a rearward wall of a hydraulic torque converter housing 43 bolted at 44 to a power source housing 45. A sleeve shaft 47 is welded at 46 so that it turns with the first stage impeller 16 and power input member 9. The sleeve shaft 47 is spline fitted at 48 to a drive rotor 49 of a vane type hydrostatic pump 50 for the hydraulic control system of the present device. Bolted at 51 is a frontal enclosure element 52 of the hydrostatic pump 50 and is center bored to rotatably support sleeve shaft 47.

Figure 2:
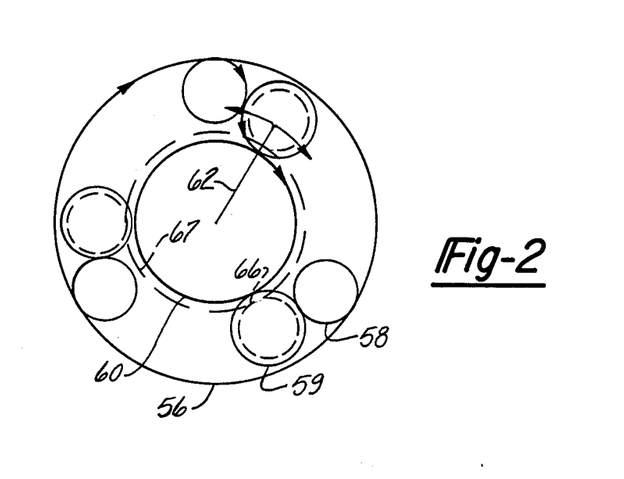
FIG. 2 is a schematic drawing of the preferred pitch diameters of gear members in a double and planetary gear set of which the forward end gearing arrangement provides the infinitely variable ratioing forward drive and the rearward end gearing arrangement provides the fixed ratio reverse drive.

A driving clutch element 53 is formed integrally with the turbine driven shaft 37. The clutch element 53 has spline fitted clutch plates 54 and alternating therewith are clutch plates 55 spline fitted to a ring gear 56 which forms the input member of a planetary gear set selective arrangement 57 for infinitely variable ratioing in forward drive operation. Referring to FIGS. 1 and 2, the selective gear set arrangement 57 comprises a ring gear 56, a sungear 60 and three pairs of intermeshed pinions 58 and 59. One pinion 58 of each pair also meshes with the ring gear 56 and the other pinion 59 also meshes with the sun gear 60, which is the feedback gear set member of said arrangement 57. The sun gear 60 is spline fitted to sleeve shaft 34 so as to drive the second stage impeller 18.

A carrier assembly 62 is formed integral with the output member shaft 24. This output member shaft 24 is operable for both the forward drive gear set arrangement 57 and the fixed ratio reverse drive gear set arrangement 63. The pinions 58 are rotatably mounted on axles 64 which are supported by the carrier assembly 62 and a circular forward end axle drive support 65. Axle drive support 65 is notched out for clearance of pinions 58 and 59 and is welded to carrier assembly 62.

The reverse drive gear set arrangement 63 comprises pinions 66 coaxial and integral with pinions 59. Pinions 66 are meshed with reverse drive arrangment sun gear 67. The integral pinions 59/66 are rotatably mounted on axles (not shown) and these axles are supported by and between a rearward circular axle drive support 69 and the circular forward end axle drive support 65. The rearward circular axle drive support 69 also is notched out for pinion clearances and welded to the carrier assembly 62. Formed integral with sun gear 67 is brake element 70 having an outer peripheral surface 71. A brake band 72 is disposed around the peripheral surface 71 and, upon actuation, holds the sun gear 67 stationary so that the direction of rotation of the pinions 66 reverses the direction of rotation of the output member shaft 24.

Referring back to FIG. 1, a disc-like hydraulic actuated piston 73 is operative to compress clutch plates 54 and 55 together and against a retainer ring 74 which is held in position by snap ring 75. Upon hydraulic pressure release of piston 73, a spring 76 presses against a plate 77 and returns the piston 73 to a stop shoulder 78 integrally formed with piston 73. The stop shoulder 78 abuts against the inner surface 79 of the driving clutch element 53 and thus forms a flow space 80.

A hydraulic pressure seal 81 is positioned in a groove between the outer diametrical surface of the piston 73 and the inward diametrical surface of the clutch element 53. Encircling the sleeve shaft 34 is a hydraulic pressure seal 82. Bolted at 83 is the gearing transmission case 84 and shown integral therewith is bearing 85 supporting rotatably the enlarged diameter 68 of the output member shaft 24. A parking gear 86 is spline fitted to the output member shaft 24 and is held in position by snap ring 87.

A portion of the lower rearward wall section 42 of the hydraulic torque converter housing 43 extends more rearwardly than the rearward wall section above it. Broken lines 88 illustrate the discharge flow passages leading away from the hydrostatic pump 50. Referring to FIG. 1, a valve housing 89, which is bolted at 90 to a gearing transmission case 84, illustrates the pattern of channelled flow passages which selectively connect the hydraulic pressure flow to produce either forward or reverse drive, or "park".

Figures 3, 4, 5:
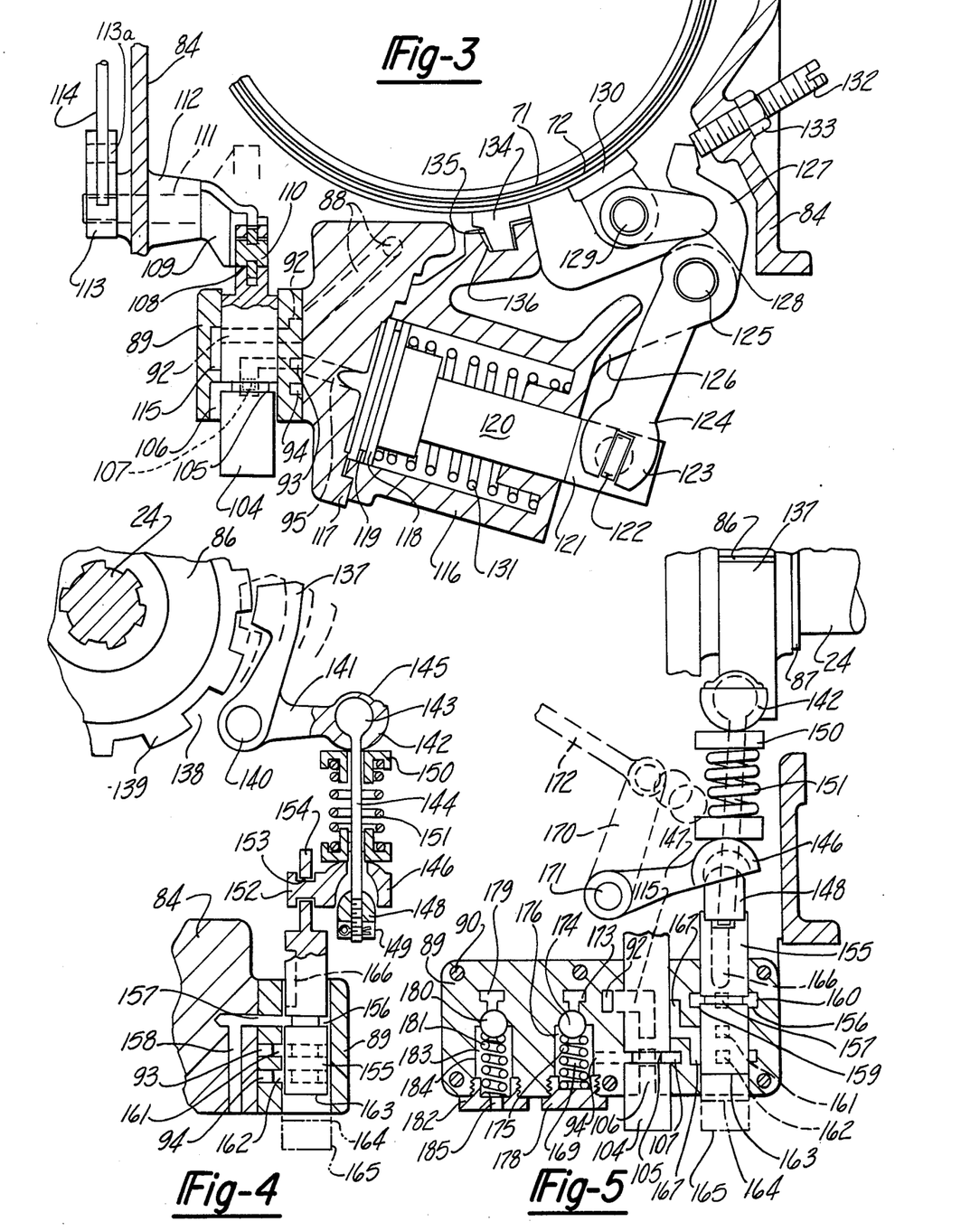
FIG. 3 is a partial cross section of a hydraulically actuated braking mechanism to selectively brake a second sun gear to effect reverse drive.
FIG. 4 is a partial side view of the parking gear and its locking pawl and sectional view of the selector valve assembly for operational functions in conjunction therewith.
FIG. 5 is an end view of the locking pawl assembly and sectional view of the complete hydraulic valve assembly.

With reference to FIGS. 1 and 3, flow ports 91 and 92 register with the hydrostatic pump discharge flow passages 88. Channelled flow passage 93 is open to fluid flow passage 95 to actuate the brake band 72, which holds the sun gear 67 stationary, thus providing reverse drive operation. Channelled flow passage 94 is connected by flow passages 96 to the flow space 80 for actuation of the hydraulic disc-like piston 73 for both forward and reverse drive operation. The flow passage 96 includes a circular groove 98 and, in the output member 24, a radial bore which meets a central, longitudinal bore. Another radial bore extends from the central, longitudinal bore to a groove similar to that of circular groove 98 and which is open through a hole drilled through sleeve shaft 34 and, ultimately, to flow space 80. Hydraulic pressure seals 99 minimize pressure leakage in operation. A threaded plug 100 (FIG. 1) closes the forward end of the central, longitudinal bore in shaft 24. A valve port 97 is open to a pressure flow release discharge passage 101. A hydraulic fluid container 102 (only partially illustrated) is bolted to the housing at 103.

Referring now to FIG. 2, the gearing members are represented by their toothed pitch diameters. The arrangement 57 provides infinitely variable forward drive and comprises a driving ring gear 56 preferably having eighty-four teeth and which meshes with the pinion 58 preferably having fifteen teeth. The pinion 59 preferably has eighteen teeth and meshes with both the sun gear 60 preferably having forty-two teeth and the pinion 58.

The pinion carrier assembly 62 can be selected for either forward or reverse drive operation. With the foregoing gearing arrangement, for example, the ratio of the ring gear 56 speed relative to the sun gear 60 speed is 0.500 and this results in a zero rotation of output carrier 62. A greater differential speed ratio between the ring gear 56 and sun gear 60 produces reverse rotation of output carrier 62.

The fixed speed ratio reverse drive gear set arrangement 63 comprises the pinion 66 formed integral with pinion 59 and in mesh with reaction sun gear 67 preferably having forty-five teeth. In operation, first the sun gear 67 is held by the brake 72 and the turbine 20 is clutched to drive the input ring gear 56. At the minimum differential of turbine speed ratio (0.500) to second stage impeller speed ratio (1.0000), one revolution of the ring gear 56 produces the following speed calculation: 84 teeth (ring gear 56) times 15 teeth (pinion 58) divided by 18 teeth (pinion 59 which drives pinion 66) equals 69.997 teeth which contact the pinion meshed with braked sun gear 67 having 45 teeth. Thus, 69.997 divided by 45 equals 1.555 ratio. Subtracting the turbine revolution equals 0.555 which, divided by 2.000 revolutions of the feedback sun gear and second stage impeller produces a reverse speed ratio of 0.277 for carrier assembly 62 and thus of output shaft 24. Since the second stage impeller 18 approximates the speed ratio of the first stage impeller 16, the overrunning clutch 26 drives the first and second stage impellers in unison by the power source. This provides large impeller torque absorption from the power source at low speeds for this reverse drive arrangement.

Figures 6, 8:
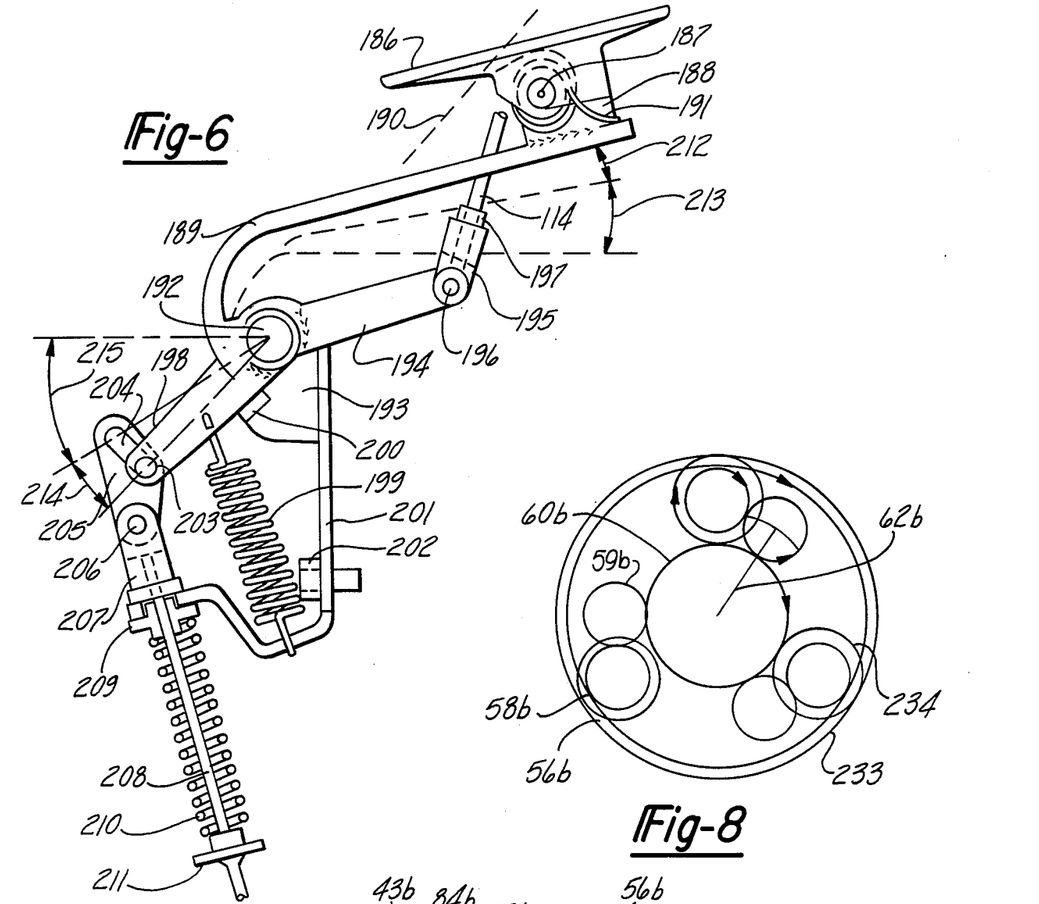
FIG. 6 illustrates automatic means whereby the power input is clutched with the input gear set member preceding power acceleration and whereby the power is de-accelerated preceding clutch disengagement with the power source.
FIG. 8 is a planetary gear set arrangement illustrated schematically by the pitch diameters of the gear members utilizing a second ring gear with braking means as a reaction member for reverse drive application.

With reference to FIGS. 1 and 3, a valve spool 104 is mounted for vertical movement in a valve housing 89, and has an encircling flow groove 105 positioned around it which registers with fluid discharge port 106 which in turn is open to the hydraulic fluid container 102 (FIG. 1). The flow groove 105 simultaneously is open to a flow port 107, the channelled flow passage 94 and the passage 96 to the flow space 80. The valve spool 104 has a stem 108 formed integral with it and slotted vertically to receive a forked end of lever arm 109. A clevis pin 110 is rotatably mounted through the stem area and is flattened at the slotted area to receive the open portion of the forked end of lever arm 109. A shaft 111 is formed integral with the lever arm 109 and is rotatably mounted in a bored hole in a hub 112 in the gearing transmission case 84. A lever arm 113 is fitted by splines or serrations to shaft 111. At its free end, the lever arm 113 is slotted to receive an eye formed at the end of an actuation rod 114. A clevis pin 113a is inserted in the eye and is supported by the slotted end of the rod lever arm 113. And extended length of the rod 114, as shown in FIG. 6, enables movement of the rod 114 in conjunction with movement of an accelerator pedal for throttle control of the power source. During the initial minor portion of the actuation of the accelerator pedal movement, a dwell is provided before the rod 114 vertically moves the valve spool 104.

With the accelerator pedal at rest, the valve spool 104 flow groove 105 registers with the pressure flow release ports 106 and 107 and is open to channelled flow passages 94, 96 and 88, and ultimately open to the flow space 80 for piston 73 actuation. Simultaneously, the valve spool 104 blocks elongated pressure flow port 115 which is open to flow port 92 and flow passages 88. In this position, the valve spool 104 stops further pressure flow from the hydrostatic pump 50. Flow passage 93 is open to flow passage 95 and the bore of hydraulic cylinder 116 which is secured by bolts to a support bracket 117 on the transmission case 84.

A piston 118 having a pressure seal 119 is actuated by hydraulic pressure flow from passage 95. Formed integral with the piston 118 is a rod 120 flattened at the free end 121. Rotatably mounted therein is clevis pin 122 flattened at each end for engagement by two slotted members 123 (one shown) straddling the flattened portion 121 of the piston rod 120. The members 123 are formed integral with an actuating lever 124. Lever 124 is rotatably mounted on a shaft 125 and is supported by and between a pair of brackets 126 integrally formed with the cylinder 116.

Still referring to FIG. 3, integral with the lever 124 is an extended element 127 also rotable on the shaft 125 and dimensioned to provide a leverage ratio for multiplying the force from displacement of the piston 118 to an arm 128. The arm 128 is pivotally mounted on shaft 129 which is supported in a bracket 130 welded to one end of the brake band 72. Upon displacement of the piston 118, the arm 128 brings the brake band 72 into braking engagement with the peripheral surface 71 of brake element 70 integrally formed with the sun gear 67 (FIG. 1). Upon hydraulic pressure release in cylinder 116, a compression spring 131 returns the piston 118 to a position controlled by the setting of an adjusting screw 132 and locking nut 133 which compensate for band wear. Also welded to the brake band 72 is a bracket 134 having an angular camming surface 135 engaging a matching camming surface 136 of a stationary portion of the hydraulic cylinder 116. With displacement of the piston 118, the camming surface 135 compels the brake band 72 to hug the peripheral surface 71 of the brake element 70.

With reference to FIG. 4, a locking pawl 137 is spring loaded to engage a space 138 between the teeth 139 on the parking gear 86, upon sufficient rotation of the output shaft 24. Formed integral with the pawl 137 and pivotal on shaft 140 is a lever 141 which has a socket element 142 formed at its outward end. A ball end 143 of an actuating rod 144 is positioned in the socket element 142. A cap 145 is welded to socket element 142 to confine the ball end 143 of the rod 144 in the socket element 142.

With reference to FIGS. 4 and 5, a socket element 146 is formed integral with a lever 147. Threaded on rod 144 at the opposite end is lock nut 148 having a ball-like nose for nesting in the cavity of socket element 146. The opposite end of lock nut 148 is slotted and registers with a hole drilled through the rod 144. A cotter pin 149 is inserted therethrough to maintain the lock nut 148 at a specific distance from the ball end 143. A pair of spring retainers 150 are separated by a compression spring 151 and abut against the socket elements 142 and 146. A shouldered stud-like element 152 is formed integral with the socket element 146. The stud-like element 152 is inserted in a slot 153, open at one end, formed in a blade-like stem 154 having a width equal to the diameter of the valve spool 155 and formed integral therewith.

The valve spool 155 has an encircling flow groove 156 and is shown open to the flow port 157 and a flow passage 158 is open to discharge into the container 102 (FIG. 1). At the same operational position, the flow groove 156 also registers with flow ports 159 and 160 (FIG. 5) which are connected to channelled flow passages 93 and 94 (FIG. 1). The hydraulic pressure is thus released from both channelled flow passages 93 and 94 (FIGS. 1 and 4), when locking pawl 137 is positioned to engage parking gear 86 as shown in FIG. 4. This position of the valve spool 155 corresponds to the operation of "park". A lever 170, shown in phantom line in FIG. 5, is spline fitted to a shaft 171 outside the transmission case 84 and is integral with the lever 147. Thus, lever 147, locking pawl 137 and valve spool 155 are all actuated by a rod 172 connected to lever 170.

With reference to FIGS. 4 and 5, flow port 161 is open to channelled flow passage 93 and flow port 162 is open to channelled flow passage 94. For "reverse" drive, lever 147 positions valve spool 155 to the position indicated by broken lines 164, thus, closing ports 157, 159 and 160. The encircling flow groove 156 then registers with the ports 161 and 167 and flow passages 93 and 95. To provide actuation of piston 118 to brake the reaction sun gear 67, the accelerator pedal movement is transmitted by rod 114 the associated elements of FIG. 6, and levers 113 and 109 to valve spool 104 thus closing ports 106 and 107. The valve spool's encircling flow groove 105 then registers with the elongated port 167, port 115 and flow passages 92 and 88 thus receiving hydraulic pressure flow from the hydrostatic pump 50. Therefore, from encircling flow groove 156 of valve spool 155, hydraulic pressure flow enters channelled flow passages 93 and 95 to piston 118, and actuates the braking mechanism, previously described, to hold the reaction sun gear 67 stationary. Actual consumation of "reverse" drive follows in immediate sequence after the actuation of the piston 118. A hydraulic pressure build-up in the channelled flow passage 93 is open to port 173 which unseats the ball 174 (FIG. 5) against the force of the spring 175 which is held in place by a threaded cap 178. Hydraulic pressure flow thus enters chamber 176 and in to a port 169. The port 169 is open to the channelled passage 94 which is open to the flow space 80 thus causing actuation of the disc-like piston 73. The piston thus engages the clutch and connects the turbine 20 to drive input ring gear 56, thereby consumating "reverse" drive responsive to the power source. Upon release of the accelerator pedal, the valve spool 104 returns to the position shown in FIGS. 3 and 5 whereby the hydraulic pressure flow from hydrostatic pump 50 is closed off by valve spool 104 and the encircling flow groove 105 registers with the ports, 106, 107 to release the hydraulic pump 50 pressure and release the piston 73. With the hydraulic pressure flow closed off at port 115, the power source throttle is positioned at "idling" while the accelerator pedal is at "rest". In the latter instance, the increasing hydraulic pressure build-up in flow passages 88 and 91 (FIG. 1) enters port 179 and unseats a ball 180 against the force of a spring 181 which is held in place by a threaded cap 182. The hydraulic pressure flow then passes through port 179 into chamber 183 of the relief valve 184 and through a hole 185, in the threaded cap 182 to container 102.

For "forward" drive, lever 147 positions the valve spool 155 as indicated by 165, (FIGS. 4 and 5) so that its encircling flow groove 156 registers with ports 162, channelled flow passage 94 and the elongated port 167. Simultaneously, the valve spool 155 closes off ports 159 and 160, which are open to channelled flow passages 93 and 94, respectively FIG. 1. This prevents fluid discharge from the channelled flow passages through port 157 and flow passage 158 and to container 102. Instead, at this position 155 of the valve spool 156 the vertical flow groove 166 registers open to ports 157 and 161 which are open to channelled flow passage 93 and thus release hydraulic pressure. Since channelled flow passage 94 and the flow space 80 are continuous through passage 96, when the vehicle is in "forward" drive (indicated by valve spool 155 position 165 in FIGS. 4 and 5), the hydraulic pressure actuates the disc-like piston 73 while, simultaneously, the valve spool 155 closes off ports 159 and 160. However, vertical flow groove 166 in valve spool 155 opens port 161 to port 157 to release hydraulic pressure from cylinder 116 thru flow passage 158, (FIG. 4) to container 102, thus, disengaging the brake 70 which held sun gear 67 stationary in the "reverse" drive arrangement 63. The actual engagement or disengagement of "forward" drive is as previously described for "reverse" drive motion is controlled by movement of the accelerator pedal and the resulting movement of the valve spool 104. After a minor portion of accelerator pedal total movement, the valve spool 104 registers its encircling flow groove 105 with ports 115 and 167 to accommodate the transmission of fluid flow between the said two latter ports during the remainder of the valve spool movement caused by the accelerator pedal actuation. With the just described valve spools 155 and 104 positioning functions, the pressure flows from the hydrostatic pump 50 to the disc-like piston 73 to actuate clutching engagement of the turbine 20 to drive input ring gear 56. Release of accelerator pedal to "rest" withdraws valve spool 104 to the position shown in FIGS. 3 and 5, thus closing of the hydrostatic pump 50 flow pressure at port 115 and causing release by relief valve 184. The encircling flow groove 105 registers open to ports 106, 107 and the channelled flow passage 94 to the flow space 80 for pressure release discharge into container 102 thereby disengaging the clutch.

FIG. 6 is an illustration of a mechanism for throttle control of the power source and to provide the operating movement of the valve spool 104 from foot actuation of an accelerator pedal 186. The pedal 186 is pivotally supported on shaft 187 held in position by bracket 188 welded to accelerator arm 189. Broken lines 190 indicate the tilt movement of accelerator pedal 186 against a wind-up spring 191 pressure. The accelerator arm 189 is welded to a shaft 192 which is rotatably supported by a pair of brackets 193 (only one shown). Welded to the shaft 192 is a lever 194 having a pivotal connector 195 attached to it by a clevis pin 196. Threaded into connector 195 is the rod 114 with a locking nut 197. Another lever 198 is welded to shaft 192. Attached to lever 198 is restraining spring 199 holding lever 198 against a stop 200 integral with the bracket 193 and defining the "rest" position for accelerator pedal 186. Brackets 193 are formed as parts of supporting frame 201 to which are attached the other end of spring 199 and hold down bolts 202. Lever 198 has a driving pin 203 inserted in a dwell slot 204 of a follower 205 joined by clevis pin 206 to a connector 207 for unison travel therewith.

The power source throttle control rod 208 extends through holes in the supporting frame 201 while a spring retainer 209 held against said frame by a spring 210 encircles the control rod 208. Therefore, at the "dwell" position, the driving pin 203 is held at the end of the dwell slot 204 closest to the supporting frame 201. From the "rest" position of accelerator pedal 186, movement through the distance 212 corresponds to the travel required of valve spool 104 before its encircling flow groove 105 first registers with the flow ports 115 and 167. The "dwell" period 214 of the throttle control rod 208 is related to the accelerator pedal movement distance 212 and the throttle control rod movement distance 215 is related to the remainder of accelerator pedal movement 213. Thus, the travel distance of the driving pin 203 to the end of the dwell slot 204 represents the dwell period.

Figure 7:
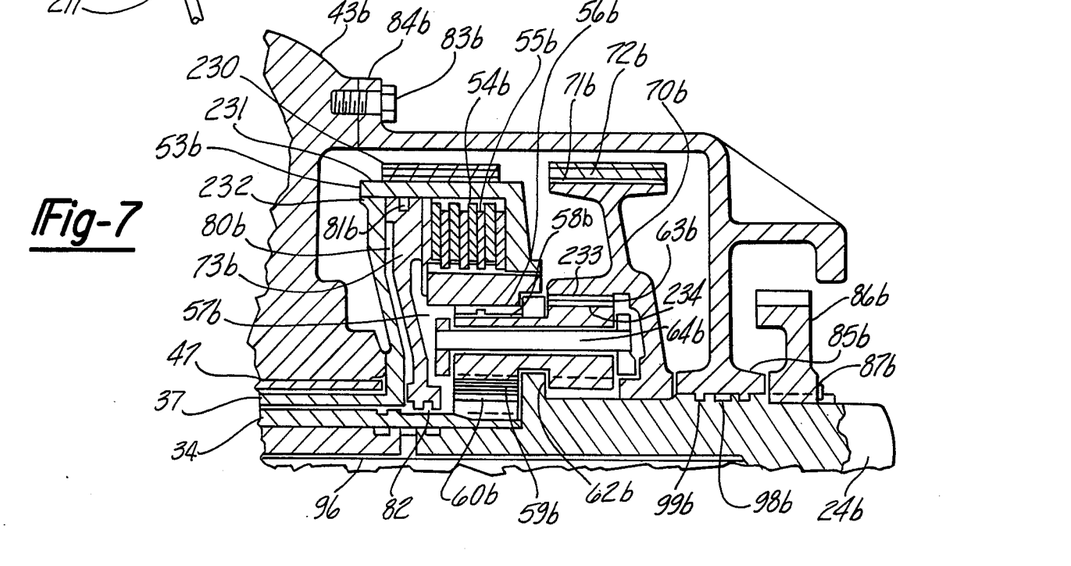
FIG. 7 illustrates means to selectively disengage the turbine drive and engage it with braking means to hold the turbine stationary to act as a hydraulic brake in conjunction with said one-way clutch acting between the through output shaft and the power source.

With reference to FIG. 7, a modification is illustrated to provide greater braking torque restraint of the output shaft 24 when the shaft 24 tends to overrun upon vehicular coasting. The arrangement of FIG. 7 has parts identical to those in FIG. 1 indicated by the same numerals and parts with identical function but modified as to size and or form which carry the same numerals but with the affix b. Selectively, in sequence with the disengagement of the clutch plates 54b spline fitted to the driving clutch element 53b and the driven clutch plates 55b spline fitted to the input ring gear 56b, the brake band 230 is applied to peripheral surface 231 of driving clutch element 53b coupled to sleeve shaft 37 and the turbine 20 is held stationary. Therefore, during vehicular coasting, through the overrunning clutch 26, the output shaft 24b drives the first stage impeller 16 which by its action on the motive fluid absorbs restraining torque from said output shaft and the turbine, held stationary, absorbs the first stage impeller torque. With greater vehicular descent momentum, the output shaft speed correspondingly produces greater hydraulic braking restraint torque on said shaft which is ideal for commercial vehicles in mountainous terrain. Additional economy may be obtained by cutting off electric fuel injection on long descents.

The other objective of the arrangement of FIG. 7 is the provision of ring gear 233, instead of the sun gear 67, as the reaction gear set member of the reverse drive arrangement 63b. This also reduces the overall diameter of the infintely variable ratio forward drive gear set arrangement 57b of which input ring gear 56b preferably has seventy-two teeth, intermeshed pinions 58b and 59b both preferably having fifteen teeth and wherein pinion 58b is meshed with ring gear 56b and pinion 59b is meshed with feedback sun gear 60b preferably having thirty-six teeth. Thus the same ratioing factor is obtained as that of the forward drive gear set arrangement 57 of FIG. 1. The carrier assembly 62b is the output member common to both the infintely variable ratioing gear set forward drive arrangement 57b, and the fixed ratio gear set reverse drive arrangement 63b. The reaction ring gear 233 is formed integral with the brake element 70b. Meshed with the ring gear 233 are pinions 234 coaxial and integral with the pinions 58b and rotatably mounted on shafts 64b in carrier assembly 62b. The pinions 234, preferably having 19 teeth, are meshed with stationary ring gear 233 preferably having 75 teeth. Pinions 58b are driven by input ring gear 56b, thus causing the carrier assembly 62b and output shaft 24b to rotate in the reverse drive direction.

The calculations for reverse drive gear set arrangement FIGS. 7 and 8 are as follows: Turbine driven input ring gear 56b having 72 teeth and making 0.500 revolution to one revolution of first stage impeller 16 and power source 9 equals 36.0. This, multiplied by 19 teeth (pinion 234) and divided by 15 teeth (pinion 58b), yields a ratio of 45.6. This ratio, 45.6, divided by the product: 75 teeth (stationary ring gear 233) multiplied by the revolution factor (0.500), equals a ratio of 1.216. Subtracting the pinion reverse orbital travel factor (1.000) equals a ratio of 0.216 for the reverse drive carrier assembly 62b relative to the rotation ratio of 0.500 for the turbine driven input ring gear 56b and relative to the ratio of 1.000 for the power source driven first stage impeller. The actual reverse drive speed ratio of carrier assembly 62b and output shaft 24b is calculated by adjusting this ratio (0.216) for the overrunning factor of the second stage impeller 18 as follows: Ratio 0.216 divided by 72 teeth (input ring gear 56b) and multiplied by 36 teeth (feed back sun gear 60b) equals 0.108. When added to the basic speed ratio (1.000), the overrunning factor is derived (1.108). Thus, the turbine and ring gear 56b speed ratio (0.500), divided by the overrunning factor (1.108) and multiplied by the ratio (0.216), equals 0.0974, i.e. the actual reverse drive speed ratio of carrier assembly 62b and output shaft 24b relative to the power input. Other gear ratio proportions may be utilized without departing from the concept characteristics.

Referring back to the reverse drive gear set arrangement 63 of FIGS. 1 and 2, because the gear set reaction member 60 is a sun gear instead of a ring gear, the orbital reverse orbital travel factor of pinion 66 meshed with sun gear 67 is fifty percent of that by a reaction ring gear. Thus, as described before, the first and second stage impellers rotate at approximately the same speed ratio.

With the first stage impeller vanes 17 fashioned to impart fluidly the peak output torque at the customary match point of fluid clutching, the second stage impeller vanes 19 are fashioned to absorb the feedback gear torque which is the second stage overrun is the sum of two forces, namely the feedback gear ratio exerted by turbine torque amplification and the differential reaction force which starts at a zero valve at output stall and progressively increases to a peak value at the match point of fluid clutching. Should the second stage impeller vanes 19 be proportioned to include this additional differential reaction force factor at its peak value, this second stage impeller 18 would rotate at the same speed ratio as the first stage impeller 16. Therefore, should any appreciable reduction from said peak value of this latter force factor be utilized for proportionment of the second stage vanes 19, it should be compensated by a corresponding degree of overrun by this second stage impeller 18.

Several types of gear set arrangements can provide the described "differential co-action" besides the preferred one illustrated.

An important novel feature of the present invention resides in the torque feedback means, i.e., the sun gear 60 which drives the second stage impeller 18. This feedback means causes the second stage impeller 18 to overrun so that the first stage impeller 16 rotates at a speed intermediate the second stage impeller 18 and the turbine 20. By this provision, the fluid discharge velocity from the turbine at the clutching match point is substantially equal to the inlet fluid velocity for the first stage impeller 16 thus minimizing the efficiency loss in the torque converter 15. Furthermore, as previously described, if the thickness of the turbine vanes affects the fluid discharge velocity from the turbine, this can be rectified by varying somewhat the angularity of the discharge end of the turbine vanes.

Having thus described my invention, I claim:

1. In combination:
   a housing,
   an input drive shaft extending into the housing,
   an output shaft extending outwardly from the housing,
   a hydraulic converter assembly comprising a first stage annular vaned impeller coupled to said input shaft, a second stage annular vaned impeller arranged to receive fluid from the first impeller, a vaned turbine arranged to receive fluid from the second impeller, a vaned reaction member arranged to receive fluid from the turbine, and a one-way brake coupled to said vaned reaction member which enables free wheeling of the reaction member in only one direction,
   an infinitely variable gear arrangement comprising a feedback sun gear drivingly connected to said second impeller, a ring gear, means for drivingly connecting said ring gear to said turbine, a carrier connected to said output shaft, at least one pair of intermeshed pinions rotatably mounted to the carrier, one of said pinions being meshed with the sun gear and the other pinion meshed with the ring gear, and
   wherein said sun gear rotatably drives said second stage impeller at a speed greater than the first stage impeller so that, at a predetermined fluid clutching match point, the discharge fluid velocity from the turbine substantially equals the inner fluid velocity of the first state impeller,
   selectively operable clutch means movable between an engaged position and a disengaged position for drivingly connecting said turbine to said ring gear only when said clutch means is in said engaged position, wherein said clutch means further comprises a plurality of enmeshed clutch plates and means to compress said clutch plates together,
wherein said compressing means further comprises a fluid operated piston movable between a first and a second position wherein said first position said clutch means is in said disengaged position and wherein in said second position said clutch means is in said engaged position,
wherein said transmission is used in conjunction with a vehicle having a throttle, said throttle being movable between an idle position and a depressed position and furher comprising a hydraulic system means responsive to the movement of the throttle away from said idle position for actuating said piston so that said piston moves from said first and to said second position.

2. The invention as defined in claim 1 wherein said input and output shafts are coaxial.

3. The invention as defined in claim 1 wherein the number of teeth on said sun gear is one half the number of teeth on ring gear.

4. The invention as defined in claim 1 and further comprising means for holding said sun gear stationary to provide a fixed ratio drive of the output shaft in the reverse direction.

5. The invention as defined in claim 4 wherein said holding means comprises a hydraulic brake.

* * * * *